United States Patent [19]
Campbell

[11] 3,872,930
[45] Mar. 25, 1975

[54] LAWN EDGER

[76] Inventor: Rouel R. Campbell, 7064 E. 52nd, Tulsa, Okla. 74145

[22] Filed: Mar. 13, 1973

[21] Appl. No.: 340,712

[52] U.S. Cl. ................. 172/15, 172/17, 172/113
[51] Int. Cl.. A01d 35/00, A01b 33/08, A01b 45/00
[58] Field of Search ................ 172/13–18, 172/118, 112, 113; 56/295; 37/94

[56] References Cited
UNITED STATES PATENTS

| | | | |
|---|---|---|---|
| 2,702,502 | 2/1955 | Rogneby | 172/118 X |
| 2,725,813 | 12/1955 | Stoeder | 172/15 |
| 2,827,748 | 3/1958 | Simpson | 172/14 X |
| 2,882,977 | 4/1959 | Smith et al. | 172/15 |
| 2,979,837 | 4/1961 | Hunter | 172/113 X |
| 3,006,421 | 10/1961 | Feilbach | 172/15 |
| 3,086,596 | 4/1963 | Allegretti et al. | 172/15 |
| 3,139,940 | 7/1964 | Randell | 172/17 UX |
| 3,141,507 | 7/1964 | Henry | 172/15 |
| 3,157,978 | 11/1964 | McMullen | 56/295 |
| 3,319,365 | 5/1967 | Perry et al. | 37/94 |
| 3,625,292 | 12/1971 | Lay | 172/13 |

*Primary Examiner*—Robert E. Bagwill
*Assistant Examiner*—Steven A. Bratlie
*Attorney, Agent, or Firm*—Mildred K. Flowers

[57] ABSTRACT

A power lawn edger or edge trimmer having coaxial rolling guide means for facilitating movement of the edger along a curb, sidewalk, or the like, during operation thereof, and being provided with discharge means for directing debris away from the device in a manner whereby danger therefrom is maintained at a minimum.

4 Claims, 3 Drawing Figures

PATENTED MAR 25 1975 3,872,930

LAWN EDGER

BACKGROUND OF THE INVENTION

1. Field of the Invention

This invention relates to improvements in lawn edgers and more particularly, but not by way of limitation, to a power lawn edger having guide means and debris discharge means for facilitating the operation of the device and reduce the hazards during the operation thereof.

2. Description of the Prior Art

The usual power drive lawn edger or trimmers available today are usually driven by either a gasoline engine or an electric motor. The gasoline engine type is probably the more preferable, and is most widely used because this type edger has sufficient power to cut through heavy turf and dried and hardened soil. The gasoline powered trimmers have certain disadvantages, however, in that the rotating blade usually throws debris and small rocks outwardly from the device, which is hazardous. If the cutting blade is rotating in one direction, the debris is cast in a direction toward the operator of the device, and if the blade is rotating in an opposite direction, the debris is thrown onto the sidewalk or curb and may endanger any person walking along the area. The electric motor type edger also has similar disadvantages, and in addition, there is danger of electrical shock in damp working conditions. Another disadvantage of the electrical motor type edger is the danger of cutting or severing the electric cord supplying power for the motor. It will be apparent that both types of edgers are somewhat dangerous in operation.

SUMMARY OF THE INVENTION

The lawn edger of the present invention is particularly designed and constructed for reducing the dangers of the operation of this type device to a minimum, and for directing debris onto the lawn area and away from the sidewalk or curb area itself. The novel power lawn edger is provided with a guide means for guiding of the edger along the edge of the walkway, or the like, for facilitating the cutting operation. In addition, a deflector is provided in the proximity of the cutting blade for deflecting or guiding debris away from the sidewalk or curb area and onto the lawn area, thus reducing the hazard to the operator of the device or persons moving along the sidewalk which might occur from flying particles released during the cutting operation. The novel lawn edger is simple and efficient in operation and economical and durable in construction.

DESCRIPTION OF THE PREFERRED EMBODIMENT

Figure 1:
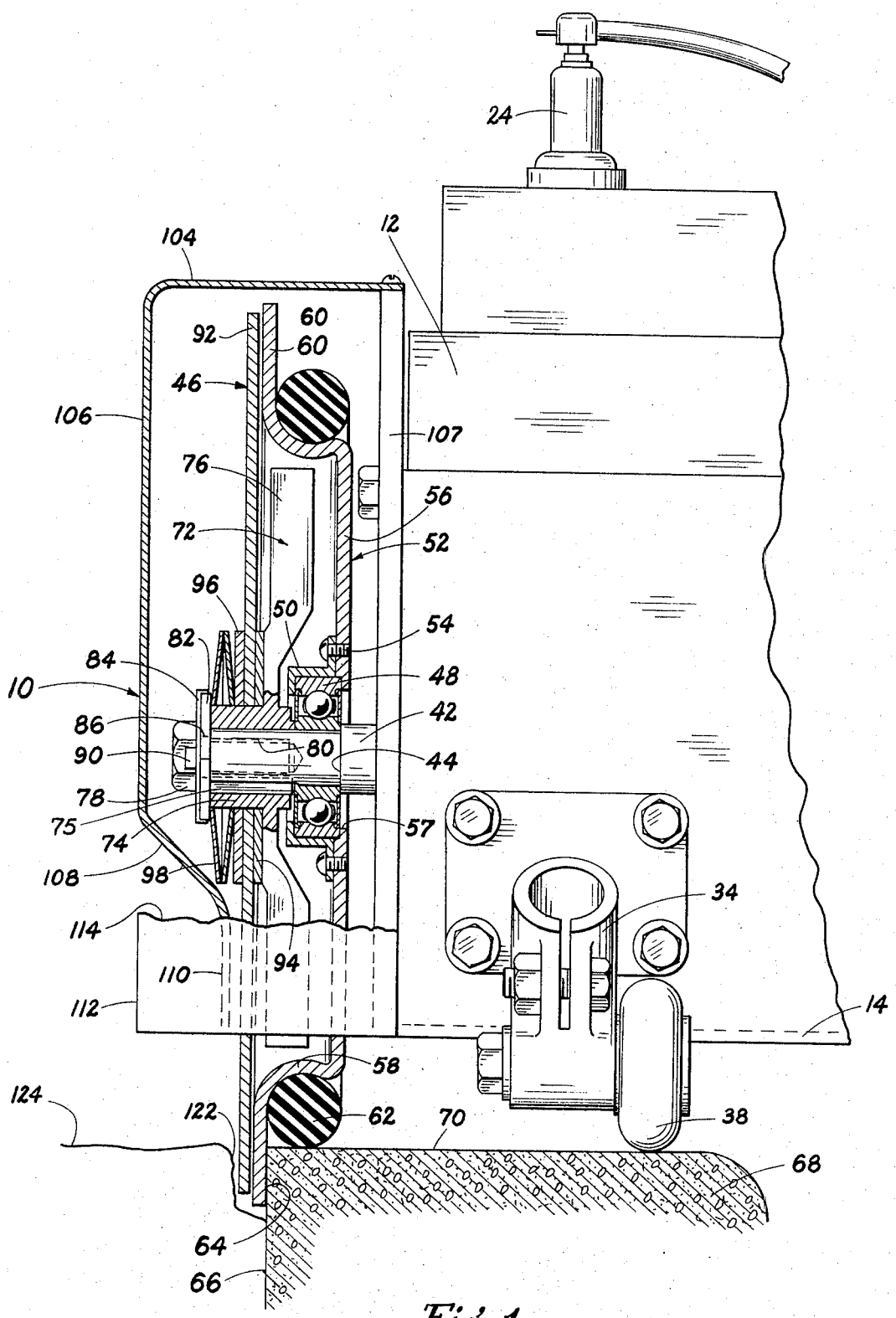
FIG. 1 is a broken front elevational view of a lawn edger embodying the invention in use with a curb, and with portions depicted in section for purposes of illustration.

Referring to the drawings in detail, reference character 10 generally indicated a lawn edger comprising a power plant 12 suitably secured to a support plate or frame 14 in any well known manner (not shown). Whereas the power plant 12 may be of any desired type, such as an electric motor, gasoline engine, or the like, as desired, the power plant 12 shown herein is of the gasoline engine type and is provided with the usual gas tank 16, carburetor 18, air filter 20, muffler 22 and spark plug 24 necessary for the efficient operation of the power plant. A choke 26 is also provided for the engine 12 and is preferably connected with a remote control operator mechanism 28 by means of a Bowden cable 30, or the like. The remote control operator mechanism 28 is preferably suitably secured to a handle assembly 32 of any well known type which is suitably secured or connected to a pair of spaced split sleeve connector members 34 (only one of which is shown in the drawings) secured to the plate or frame 14 or otherwise secured on the apparatus 10. In addition, a suitable recoil type starter 36 is provided for the engine 12 for initiating the operation thereof, as is well known, and a pair of spaced wheels 38 and 40 are journalled on the frame or plate 14 in any suitable manner for rollingly supporting the device 10 during operation thereof as will be hereinafter set forth.

The engine 12 is provided with a rotatable drive shaft 42 having an annular shoulder 44 thereon for receiving a cutting assembly 46 thereagainst. The cutting assembly 46 comprises a suitable sealed bearing member 48 disposed against the shoulder 44 and having the inner race thereof secured to the shaft 42 in any suitable manner, such as by a press fit thereon, for rotation simultaneously therewith. The outer race of the bearing 48, of course, is freely rotatable independently of or with respect to the inner race thereof, as is well known. A flanged housing 50 is disposed around the outer race of the bearing 48 and may be secured thereto in any suitable manner (not shown) for simultaneous rotation therebetween.

A guide wheel generally indicated at 52 is secured to the housing 50 in any well known manner, such as by a plurality of spaced screws 54, and is preferably also supported by the outer race of the bearing member 48, as clearly shown in FIG. 1. The guide wheel 52 comprises a substantially flat plate or disc 56 having a central aperture 57 concentrically disposed around the shaft 42. A substantially cylindrical wall 58 extends outwardly from the plate or disc 56 in a direction away from the engine 12 and terminates in a radially outwardly extending circumferential guide flange 60. The outer periphery of the cylindrical wall 58 is preferably of a slightly arcuate configuration in cross-section, as may be particularly seen in FIG. 1, for receiving an annular tire element 62 thereon, thus providing a wheel-type structure for the guide wheel 52. The tire element 62 may be of substantially any desired type, and as shown herein is a solid annular ring which is substantially circular in cross-sectional configuration and constructed from a suitable resilient material, such as rubber, neoprene, or the like. The inwardly directed surface 64 of the flange 60 preferably moves along the outer edge 66 of the curb 68 (or sidewalk) and the outer periphery of the tire 62 rolls along the upper surface 70 of the curb 68 as the edger 10 is utilized during a lawn trimming operation.

Figure 3:
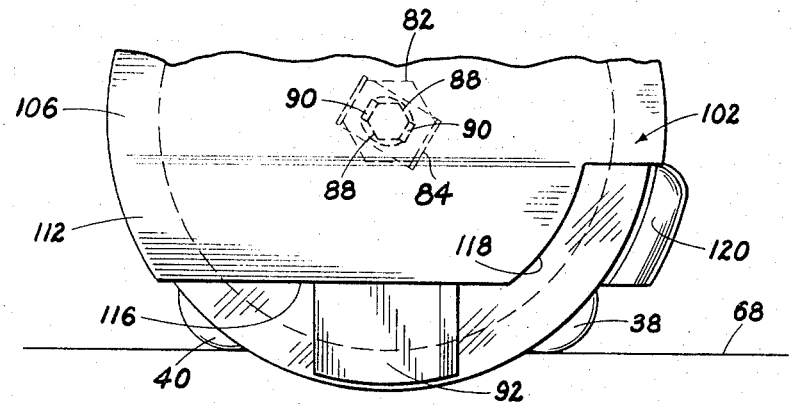
FIG. 3 is a side elevational view of a portion of a lawn edger embodying the invention and taken from the opposite side with respect to FIG. 2.
Figure 2:
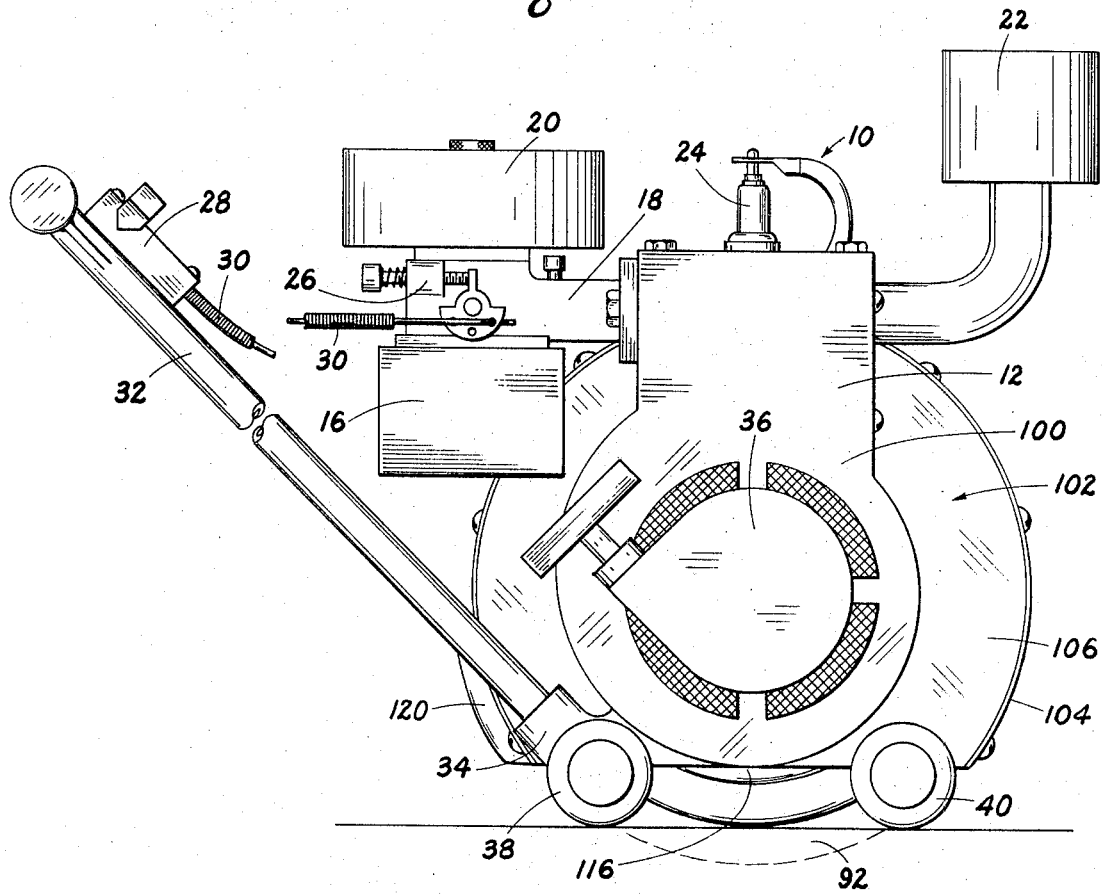
FIG. 2 is a side elevational view of a lawn edger embodying the invention.

A fan or blower 72 is provided for the cutting assembly 46 and comprises a hub member 74 having a plurality of circumferentially spaced radially extending blades 76 carried thereby. The hub 74 is keyed as shown at 75 in FIG. 1 or otherwise secured to the drive shaft 42 for rotation simultaneously therewith. The hub 74 is disposed adjacent the inner race of the bearing 48 and is retained in position on the shaft 42 by a bolt 78 threadedly secured in a longitudinally extending bore 80 provided in the shaft 42. The threads of the bolt 78 are opposite with respect to the direction of rotation of the shaft whereby rotation of the shaft 42 tends to tighten the threaded engagement of the bolts 78. For example, if the drive shaft 42 rotates in a counterclockwise direction as viewed in FIG. 3, then the threads of the bolt 78 will be right hand threads.

In order to more securely retain the bolt 78 against loosening or backing off in the bore 80, a washer 82 and a lock guard 84 are interposed between the bolt 78 and the drive shaft 42. The drive shaft 42 is provided with a reduced portion 86 on the outer end thereof extending through the washer 82 and having a pair of oppositely disposed "flats" 88 (FIG. 3) in egagement with complementary "flats" provided on the inner periphery of the washer 82 whereby the washer 82 is locked to the shaft 42 for rotation simultaneously therewith. The lock guard 84 is of a substantially cup-shaped configuration complementary with the configuration of the washer 82 and fits snugly thereon for movement simultaneously therewith. A pair of outwardly extending flanges or lugs 90 are provided on the outer face of the lock guard 84 and are disposed against opposite sides of the head of the bolt 78 for precluding independent rotation of the bolt 78 with respect to the shaft 42. In this manner accidental loss of the bolt 78 from the shaft 42 is substantially eliminated.

A cutting blade 92 of any well known type is disposed on the hub 74 between the blades 76 and the washer 82. A first friction pad 94 is disposed on the hub 74 between the cutting blade 92 and the blades 76 and a second friction pad 96 is disposed on the hub 74 on the opposite side of the cutting balde 92 with respect to the pad 94. A suitable spring washer 98 is disposed around the hub 74 and interposed between the washer 82 and pad 96 for constantly urging the cutting blade 92 and pads 94 and 96 into a tight engagement with the blades 76 for rotation simultaneously therewith. Of course, it will be apparent that if the cutting blade 92 encounters an unusually hard obstacle during the operation of the apparatus 10, a certain amount of slippage may occur between the cutting blade 92 and the blades 76 for reducing damage or breakage of the cutting blade 92.

A suitable housing 100 may be provided for the engine 12, as is well known. In addition, a housing generally indicated at 102 is provided for the cutting assembly 72 for protection of both the assembly 72 and of the personnel in the area of the lawn edger 10. The housing 102 may be of any suitable type, and as shown herein comprises a substantially cylindrical outer wall 104 having a substantially disc shaped outer portion 106 which may be integral therewith or suitably secured thereto. The cylindrical wall 104 is bolted or otherwise removably secured to a plate 107 which is suitably secured to the housing 100, or engine 12. The lower portion of the front plate 106 is rearwardly and angularly directed as shown at 108 and terminates in an offset wall 100 which is substantially parallel with the main body portion of the front plate 106, as more particularly shown in FIG. 1.

An elongated plate 112 extends across the bottom of the front plate 106 spaced from the offset wall 110 to form an exhaust channel 114 therebetween. The elongated plate 112 may be secured in position in any well known manner (not shown), and the lower edge 116 of the channel 114 is open whereby the guide plate flange 60 and wheel 62 and the cutting blade 92 extend therethrough as clearly shown in the drwings for a purpose as will be hereinafter set forth. Of course, the cylindrical wall 104 terminates in the proximity of the lower edge 116 of the channel 114 whereby the entire lower portion of the housing 102 is open for precluding interference with the operation of the cutting assembly 72.

An exhaust port 118 (FIG. 3) is provided in the housing 102 in open communication with the channel 114, and an exhaust scoop member 120 is provided conterminous with the exhaust port 118 for diverting discharging particles in a direction away from the curb 68 (or sidewalk area) as the lawn edger is utilized during a trimming operation.

When it is desired to trim a lawn along the edge of curb 68, the guide flange 60 may be disposed adjacent the curb 68 with the inner face 64 of the guide flange 60 disposed adjacent the outer surface or face 66 of the curb, as clearly shown in FIG. 1. The wheel 62 is disposed adjacent the upper surface 70 of the curb 68 for rolling therealong during the trimming operation. Of course, the wheels 40 and 38 will also be disposed on the surface 70 for moving therealong for facilitating the support of the device 10 during the trimming operation.

The engine 12 may be actuated in the usual manner for transmitting power or rotation to the drive shaft 42. As hereinbefore set forth, rotation of the guide wheel assembly 52 is completely independent of the rotation of the drive shaft 42, but the fan blades 76 and cutter blade 92 are rotated simultaneously with the rotation of the drive shaft. The forward movement of the device 10 is at the manual control of the operation of the device, as is well known, and as the device moves forwardly along the curb 68 the guide wheel assembly will roll along the curb, maintaining the position of the cutting blade 92 spaced from but in the proximity of the face 66 of the curb 68. As the cutting blade 92 cuts away the lawn in the area 122 (FIG. 1) of the lawn 124, and cuttings or other debris is picked up and thrown into the channel 114 and discharged therefrom through the exhaust port 118 and exhaust scoop 120. The blades 76 function in much the manner of a fan for assisting in removing the debris from the area 122 and discharging thereof through the exhaust scoop 120.

As hereinbefore set forth, in the event the cutting blade 92 encounters as exceptionally hard particle, or the like, the friction pads 94 and 96 will permit a certain amount of slippage of the blade 92 for reducing breakage thereof during the operation of the device 10. Of course, it will be apparent that the cutting blades and fan blades are coaxially mounted with respect to the drive shaft for providing an efficient operation and economy of structure.

In the event the device 10 is being utilized for trimming along a sidewalk (not shown), of course the operation thereof will be substantially identical with that of the curb trimming operation, with the trimmings and other debris being directed away from the sidewalk area during the trimming operation.

Of course, when it is desired to remove the cutting blade 92 for any reason, such as for repair or replacement thereof, the lock guard 84 may be manually removed from the locking position thereof with respect to the bolt 78. The bolt 78 may then be removed whereby the washer 82, spring washer 98 and friction pad 96 may be removed for permitting withdrawal of the blade 92 from its position on the hub 74. The blade 92 may be repaired or replaced, and the assembly restored to the original locked position thereof in order that the device 10 may be operated in the usual manner.

From the foregoing it will be apparent that the present invention provides a novel lawn edger having coaxially mounted cutting blades and fan blades and guide carried by a common drive shaft, with the exhaust channel being particularly designed and constructed for directing debris away from the curb or sidewalk area during a trimming operation. In addition, novel locking means is provided for removably securing the cutting blade in position in a manner substantially eliminating accidental dislodging of the cutting blade during operation of the device. The novel lawn edger is simple and efficient in operation and economical and durable in construction.

Whereas the present invention has been described in particular relation to the drawings attached hereto, it should be understood that other and further modifications, apart from those shown or suggested herein, may be made within the spirit and scope of this invention.

What is claimed is:

1. A lawn edger comprising power means in a housing and having a rotatable drive shaft, bearing means mounted on said drive shaft, guide wheel means coaxially mounted on said bearing means and having a continuous outer periphery, said bearing means providing independent rotation of the guide wheel means with respect to the drive shaft, ground engaging support roller means depending from said housing and laterally spaced from the guide wheel means for cooperation therewith to facilitate movement of the lawn edger, blower means coaxially mounted on the drive shaft and secured thereto for simultaneous rotation therewith, cutting blade means coaxially mounted on the drive shaft and outwardly of said blower means, locking means removably securing the cutting blade means and guide wheel means to the drive shaft, spring washer means interposed between the locking means and cutting blade means for urging the cutting blade means in a direction toward the blower means, friction means coaxially mounted on said drive shaft between the blower means and cutting blade means for transmitting rotation to the cutting blade means and permitting slippage of the cutting blade means upon engagement of the cutting blade means with extremely hard material, cover means mounted on said housing and substantially enclosing the drive shaft and blower means and cutter blade means, exhaust channel means on the lower end of the cover means for discharge of debris in a preselected direction away from the lawn edger, and scoop means on said cover means and adjacent the exhaust channel means for directing said debris in said preselected direction away from the lawn edger.

2. A lawn edger at set forth in claim 1 wherein the guide wheel comprises an apertured plate member concentrically disposed on the bearing means, an outwardly extending cylindrical wall provided around the outer periphery of the plate member, an outwardly extending circumferential flange around the outer edge of the cylindrical wall for engaging a portion of the curb wherein a trimming operation is to be performed, a tire member disposed around the outer periphery of a cylindrical wall and engagable with another portion of the curb wherein the trimming operation is to be performed, said tire member having an outer diameter smaller than the outer diameter of the circumferential flange.

3. A lawn edger as set forth in claim 1 wherein the locking means comprises a bolt member having a threaded shank with the threads thereof being opposite with respect to the direction of rotation of the drive shaft, said bolt member extending axially into the drive shaft, a washer interposed between the bolt member and the outer end of the drive shaft, cap means removably secured to the washer and having a central aperture for receiving the bolt member therethrough, and outwardly extending lug means provided on said cap means and disposed adjacent the bolt member for precluding rotation thereof independent from the drive shaft.

4. A lawn edger comprising power means in a housing and having a rotatable drive shaft, bearing means mounted on said drive shaft, guide wheel means coaxially mounted on said bearing means and having a continuous outer periphery, said bearing means providing independent rotation of the guide wheel means with respect to the drive shaft, ground engaging support roller means depending from said housing and laterally spaced from the guide wheel means for cooperation therewith to facilitate movement of the lawn edger, blower means coaxially mounted on the drive shaft and secured thereto for simultaneous rotation therewith, cutting blade means coaxially mounted on the drive shaft and outwardly of the blower means, locking means removably securing the cutting blade means and guide wheel means to the drive shaft, spring washer means interposed between the locking means and cutting blade means for urging the cutting blade means in a direction toward the blower means, friction means coaxially mounted on said drive shaft between the blower means and cutting blade means for transmitting rotation to the cutting blade means and permitting slippage of the cutting blade means upon engagement of the cutting blade means with extremely hard material, cover means mounted on said housing and substantially enclosing the drive shaft and blower means and cutter blade means, exhaust channel means on the lower end of the cover means for discharge of debris in a preselected direction away from the lawn edger, scoop means on said cover means and adjacent the exhaust channel means for facilitating directing said debris in said preselected direction, said guide wheel means comprising an apertured plate member concentrically disposed on the bearing means, an outwardly extending cylindrical wall around the outer periphery of the plate member, an outwardly extending circumferential flange having said continuous outer periphery around the outer edge of the cylindrical wall for engaging a portion of the curb wherein a trimming operation is to be performed, a tire member disposed around the outer periphery of the cylindrical wall and engagable with another portion of the curb wherein the trimming operation is to be performed, said tire member having an outer diameter smaller than the outer diameter of the circumferential flange, and said locking means comprising a bolt member having a threaded shank with the threads thereof being opposite with respect to the direction of rotation of the drive shaft, said bolt member extending axially into the drive shaft, a washer interposed between the bolt member and the outer end of the drive shaft, cap means removably secured to the washer and having a central aperture for receiving the bolt member therethrough, and outwardly extending lug means on said cap means and disposed adjacent the bolt member for precluding rotation thereof independent from the drive shaft.

* * * * *